United States Patent Office 3,246,053
Patented Apr. 12, 1966

3,246,053
SLURRY CASTING PROCESS FOR SOLID
ROCKET PROPELLANTS
Irving Kuntz, Roselle Park, and Charles E. Morrell, Summit, N.J., assignors to Esso Research and Engineering Company, a corporation of Delaware
No Drawing. Filed Jan. 29, 1958, Ser. No. 711,815
6 Claims. (Cl. 264—3)

The present invention relates to novel rocket propellants and more particularly relates to a new type of solid rocket propellants prepared by curing to solidification certain low molecular weight unsaturated polymers and copolymers having included therein solid particles of a strongly oxidizing inorganic salt.

Because of their high energy content per unit volume and the relative ease with which they can be handled, solid propellants have many advantages over other materials used as fuels in rocket propulsion systems. Such propellants are normally composited from a solid inorganic oxidizing agent and a combustible binder material. The binder material serves as the fuel for combustion and in addition acts as a matrix to provide the propellant with the requisite physical strength. This dual function imposes severe requirements as to the physical and chemical properties of the materials used as binder-fuels in solid propellant rockets. As fuels, such materials should be highly combustible, should burn evenly and completely, and should produce large volumes of low molecular weight gaseous combustion products. As binders, they should be liquids which can be readily cured to solidification at low temperatures, should possess relatively high tensile strength and shock resistance, should not evolve appreciable heat or undergo severe shrinkage during solidification. Because of these rigid requirements, asphalts and other materials used as rocket fuels in the past have not been wholly satisfactory.

The present invention provides a new type of solid rocket propellants prepared by curing to solidification certain low molecular weight unsaturated polymers to which have been added solid particles of a strongly oxidizing inorganic salt. In accordance with the invention it has now been discovered that unsaturated polymers of low molecular weight diolefins and copolymers of such diolefins with organic monomers containing vinylidene linkages can readily be mixed with a suitable oxidizing agent and cross linked by curing to form compositions which are admirably suited for use as solid rocket propellants. The matrices formed by curing such polymers and copolymers have excellent combustion properties, can be readily ignited, and burn evenly and completely with the formation of large volumes of low molecular weight exhaust gases, resulting in high thrust values per pound of propellant. The cured propellants have high tensile strengths, possess shock-resisting properties, and undergo no appreciable heat evolution or shrinkage during curing. The compositions of the invention have a surprising added advantage in that during curing they may be bonded to steel, aluminum and other metals and can therefore be cast directly into rocket shells and casings, eliminating many of the problems in rocket design and construction encountered in the past. Their thermal expansion coefficients and elasticities are such that they are not separated from the shells or casings at extreme temperatures and thus they are suitable for use under widely varying arctic and tropical climatic conditions.

The low molecular weight unsaturated polymers and copolymers employed in preparing the rocket propellants of the invention are formed by the polymerization of low molecular weight diolefins or the copolymerization of such diolefins with organic monomers containing vinylidene linkages. Such polymers or copolymers may have viscosities in the range of from about 1 poise to about 5000 poises when measured at 100° F. The polymers and copolymers must be unsaturated to some extent and may have bromine numbers of from about 1.6 to about 180, preferably from about 20 to about 120. The molecular weights of the polymeric materials may range between about 400 and about 20,000 on the Staudinger scale, molecular weights between about 1000 and about 10,000 being preferred.

Suitable diolefins for use in preparing the polymers and copolymers utilized in accordance with the invention are those containing from about 4 to about 20 carbon atoms per molecule. Examples of such diolefins include butadiene, isoprene, piperylene, cyclopentadiene, hexadiene, decadiene and the like. Mixtures of such diolefins may also be used. Butadiene has been found to be an especially useful diolefin for preparing the polymers and copolymers because of its excellent polymerizing properties and is therefore preferred.

The organic monomers containing vinylidene linkages which may be reacted with the diolefins to form copolymers are those containing from about 2 to about 20 carbon atoms per molecule and include, for example, monoolefins such as ethylene, propylene, butylene, isobutylene, pentylene, and cyclopentylene; vinyl aromatics such as styrene, and vinyl toluene; and unsaturated esters such as vinyl acetate, allyl acetate, vinyl propionate, methyl methacrylate, decyl acrylate, lauryl maleate, and octyl fumarate; and mixtures of such monomers. The copolymers will preferably contain from about 20 to about 90 mole percent of the diolefin and from about 10 to about 80 mole percent of the organic monomer. Copolymers containing from about 60 to 90 wt. percent of butadiene and from 40 to 10 wt. percent of styrene are especially preferred.

The polymers and copolymers employed in preparing the rocket propellants of the invention may be prepared by any of a number of polymerization processes familiar to those skilled in the art, such as by sodium polymerization, emulsion polymerization and bulk polymerization in the presence of a diluent and a peroxide type catalyst.

A preferred method for forming such polymeric materials is carried out by mixing the reactants, about 60 to 90 parts of butadiene and 40 to 10 parts of styrene for example, and heating them to a temperature in the range of from about 70° F. to about 200° F. in the presence of from 1 to 6 parts of a finely divided dispersed metallic sodium catalyst and from about 50 to about 500 parts of an inert hydrocarbon diluent such as petroleum naphtha boiling between about 180° and 250° F., straight run mineral spirits boiling between about 300° and 400° F., benzene, xylene, toluene, cyclohexane or the like. Ethers such as diisopropyl ether, dioxane, anisole and the like may be used as co-diluents if desired. The reaction time and induction period may vary considerably depending upon the temperature employed and the degree of catalyst dispersion but will normally range from about 15 minutes at 200° F. with a catalyst having particle diameters of less than 100 microns to about 40 hours at 120° F. with a coarse catalyst. Following completion of the reaction, the catalyst may be destroyed by treatment with excess acetic acid, neutralization with ammonia, and filtration with a filter aid such as silica gel, clay, charcoal or the like. The diluent may be removed by stripping. Similar processes may be carried out using potassium, sodium hydride and similar catalysts. Such polymerization reactions are well known in the art and, since formation of the polymer does not constitute the essence of the present invention, need not be described in greater detail.

The inorganic oxidizing agents which are combined with the low molecular weight unsaturated polymers and copolymers in preparing the propellants of the invention may be any of a number of inorganic salts known to the art as strongly oxidizing materials. Such salts include, for example, ammonium nitrate, sodium nitrate, lithium perchlorate, ammonium perchlorate, potassium perchlorate, and potassium nitrate. Ammonium perchlorate is a preferred inorganic oxidizing salt. The salts are employed in finely divided form, preferably with a particle size distribution in the range of from about 2 to 500 microns, in order to promote rapid, even and complete oxidation of the fuel.

In preparing the rocket propellants of the invention from the polymeric materials and oxidizing agents described above, a paste or slurry of the inorganic salt, the polymer or copolymer and a curing agent is first prepared by mixing on a rubber or paint mill, in a sigma blade mixer, or in other suitable mixing equipment. The paste or slurry will normally contain from about 50 to about 90% of the inorganic salt.

The curing agent added to the paste or slurry to effect cross linking of the polymer or copolymer is preferably a peroxidic catalyst such as di-t-butyl peroxide, dicumyl peroxide, cumene hydroperoxide or benzoyl peroxide, or other peroxidic catalysts often used in polymer preparation. These materials have been found to result in the formation of a solid matrix having excellent physical characteristics. The cross linking agent is added in a concontration of from about 1% to about 10%, based upon the weight of organic material present.

The paste or slurry thus produced is then compression molded, extruded or cast into the desired shape. As mentioned heretofore, a preferred method of shaping the propellant is by casting the uncured propellant in a rocket shell or housing and curing to solidification. The viscosity of the paste or slurry will have a considerable effect upon the particular shaping method employed. In many instances the polymer or copolymer itself may have a comparatively high viscosity, on the order of from 3000 to 5000 poises for example, and it will be necessary to increase fluidity of the material in order to facilitate pumping in connection with a casting operation. This may readily be accomplished by dilution of the polymer or copolymer with from 0 to about 100% by weight, based upon the polymer or copolymer, of an organic monomer containing a vinyl group such as those originally employed in the polymerization reaction. For casting purposes, solutions having viscosities of from about 1 to 100 poises at 100° F. are preferred.

The curing step in forming the solid propellants of the invention is carried out by heating the paste or slurry at a temperature of from about 60° to about 250° F. for a period of from about 10 to 120 hours. The propellant may be cured in a mold which is later removed or in the rocket shell or case if desired. When the curing takes place in a metal shell or case, it has been found that the propellants become bonded to the metal. Because such bonding facilitates later assembly of the rocket, this procedure is preferred. Atmospheric oxygen is generally excluded during curing or casting by the use of a blanket of an inert gas such as nitrogen or carbon dioxide. The solid propellant obtained by curing in this manner may have a tensile strength in the range of from 50 to about 500 p.s.i. and may be elongated as much as 15 to 30% without fracturing. Substantially no shrinkage occurs during the curing process.

The nature and objects of the invention can be further illustrated by referring to the folowing examples.

EXAMPLE 1

A copolymer prepared by the sodium catalyzed polymerization of a mixture of 80% butadiene and 20% styrene and sold by The Enjay Co. of New York under the trade name "C-Oil" was diluted with styrene to give a solution containing 57% of the copolymer and 43% styrene. A mixture of equal parts of hand ground and ball milled potassium chloride having particles ranging from about 2 to about 500 microns in diameter was then added to the solution of copolymer and styrene to form a slurry containing 75% by weight of the salt. Potassium chloride was used as a model in place of a strongly oxidizing salt such as ammonium perchlorate because facilities were not available for handling exposive materials at the time the experiment was carried out. Other experimental work has shown, however, that the results obtained with such model salts are fully equivalent to those obtained with the actual oxidizing agents except with respect to combustion properties. The slurry thus produced ranged in viscosity from about 1500 poises at 80° F. to about 400 poises at 115° F. Three percent of di-t-butyl peroxide, based upon the weight of the organic constituents of the slurry, was then added to the slurry as a curing agent. The slurry was poured into molds and cured at a temperature of 180° F. for 90 hours. No appreciable shrinkage took place during the curing step. Upon testing the solidified product it was found that it had a tensile strength of 380 pounds per square inch and could be elongated up to 18% without fracturing, indicating that castings so prepared possess excellent physical properties for use as solid propellants. Since the polyers are more highly combustible, burn more evenly and produce higher volumes of combustion gases than asphalts and similar materials used for this purpose in the past, their suitability for use as rocket binder-fuels from the standpoint of chemical properties is evident.

EXAMPLE 2

In order to determine the effect of curing agent concentration and curing time upon the properties of rocket propellants prepared in accordance with the invention, a series of experiments using various curing times and curing agent concentrations was carried out. A sodium catalyzed copolymer of butadiene and styrene was mixed with additional styrene monomer to give a solution similar to that employed in the previous example. A slurry of this solution containing 75% by weight of ball milled potassium chloride in a sigma blade mixer was prepared. Di-t-butyl peroxide was added to samples of the slurry in amounts ranging from 1.5 to 6%, based upon the organic constituents of the slurry, and the samples thus prepared were cured in molds at 200° F. for from 48 to 64 hours. Tensile strength and elongation determinations were then made upon the solidified samples. The results of these determinations are shown below.

Table I.—Effect of curing agent concentration and curing time upon the properties of solid model propellants

| Percent Curing Agent | Curing Time, Hrs. at 200° F. | Tensile Strength, p.s.i. | Percent Elongation Before Fracture |
|---|---|---|---|
| 1.5 | 48 | 325 | 11 |
| 1.5 | 48 | 245 | 7 |
| 1.5 | 64 | 365 | 14 |
| 3.0 | 48 | 185 | 8 |
| 3.0 | 48 | 300 | 11 |
| 3.0 | 64 | 320 | 10 |
| 3.0 | 64 | 200 | 8 |
| 6.0 | 48 | 200 | 9 |
| 6.0 | 48 | 315 | 10 |
| 6.0 | 64 | 100 | 7 |

As indicated by the data in the above table, acceptable physical properties can be achieved over a relatively wide range of curing agent concentrations and curing times.

EXAMPLE 3

A series of blends of 80% butadiene-20% styrene copolymers with various monomers containing vinyl groups were prepared and tested in order to determine the effect of such monomers in reducing the viscosity of the copolymer in order to permit its use in casting rocket propellants. The copolymer itself had a viscosity at 100°

F. of 3500 poises. The viscosities of the blends at the same temperature are shown below.

*Table II.—Viscosities of butadiene-styrene copolymer blends with various monomers at 100° F.*

| Wt. Percent of Monomer in Copolymer | 20% | 40% | 50% |
|---|---|---|---|
| | Viscosity (Poises) | | |
| Styrene | 27 | 2 | 1 |
| 2-Ethylhexylacrylate | 63 | 6 | 3 |
| Vinyl 2-Ethylhexylether | 63 | 4 | 1 |
| Decyl Acrylate | 125 | 8 | 3 |
| Vinyl 2-Ethylhexoate | 80 | 5 | 2 |
| Di(2-Ethylhexyl)Maleate | 250 | 45 | 15 |
| Tridecylacrylate | 250 | 25 | 8 |

The data in the table indicate that a wide variety of olefinic monomers may be blended with the butadiene-styrene copolymer to give low viscosity blends for binder-fuel use. The use of such monomers as diluents permits the use of polymers and copolymers having initial viscosities too high for conveniently handling and casting solid propellants and therefore blends containing them are often preferred over the straight polymers and copolymers.

EXAMPLE 4

It may be desirable to incorporate into the copolymer-monomer small amounts of high molecular weight material to modify or alter the physical properties of the final propellant. In order to determine the effect of the presence of such a polymer in the diluent monomers which may be used in preparing the propellants of the invention, a solution of 57% of an 80% butadiene-20% styrene copolymer and 43% of styrene containing 0.5% polystyrene was prepared. A slurry containing 75% ball milled potassium chloride and 3% di-t-butyl peroxide was prepared using this solution. Samples of the slurry in molds were then cured at 180° F. for 68 hours. Upon subsequent testing it was found that the solidified castings had a mean tensile strength of 225 p.s.i. and a mean elongation of 12% before fracturing, indicating that polystyrene or other high molecular weight polymers may be used in preparing binder-fuel compositions. In some instances it may be desirable to incorporate such polymeric organic materials into the binder-fuels.

EXAMPLE 5

A further experiment was carried out to determine whether any exothermal effects could be detected during curing of the propellants of this invention. A mixture of 4 parts by weight of an 80% butadiene-20% styrene copolymer and 3 parts by weight of styrene was used to prepare a slurry containing 75% ball milled potassium chloride and 3% di-t-butyl peroxide. This slurry was cast in a length of 3 inch iron pipe, capped under nitrogen, and placed in an oven at 200° F. The length of pipe was fitted with thermocouples at different points and these in turn were connected to a temperature recorder. Over a 72 hour period no exotherm was noted, the thermocouples indicating a temperature of 195° F. after equilibrium was reached while the oven temperature varied from 186° F. to 197° F. as the oven heaters turned on and off. It thus can be seen that curing the propellants of the invention does not produce exothermic reactions which would constitute an explosive hazard. It was found that the casting produced in this experiment was tightly bonded to the pipe and did not separate therefrom as the pipe was cooled down to ambient temperature.

EXAMPLE 6

Castings produced as in the preceding examples were further tested for the completeness of the curing operation by pulverizing them and placing them in a vacuum oven at 71° C. and 25 inches of vacuum for 64 hours. After this test period it was found that there had been no loss in weight, indicating that the curing was complete in each instance and that the castings contained no monomeric styrene or other low molecular weight material which might eventually bleed to the surface upon extended storage and thus produce cured rocket propellants of poor storage stability.

What is claimed is:

1. A process for preparing a solid rocket propellant which comprises preparing a slurry of from about 50% to about 90% by weight of a finely-divided strongly oxidizing inorganic salt and from about 10 to about 50% by weight of a copolymer of from about 60 to about 90 mol percent of butadiene and about 40 to about 10 mol percent of styrene, said copolymer having a bromine number between about 20 and about 120, a molecular weight between about 1000 and about 10,000 and a viscosity at 100° F. between about 1 and about 100 poises; incorporating into said slurry from about 1 to about 10%, based upon the weight of the copolymer, of a peroxidic cross-linking agent selected from the group consisting of ditertiary butyl peroxide, dicumyl peroxide, cumene hydroperoxide and benzoyl peroxide; and thereafter simultaneously curing said slurry to solidification and bonding the solid product to a metallic shell by heating the slurry in the shell at a temperature between about 60° F. and about 250° F. for a period of from about 10 to about 120 hours.

2. A process of defined by claim 1 wherein said copolymer is diluted with an organic monomer containing from 2 to 20 carbon atoms per molecule selected from the group consisting of monoolefins, vinyl aromatics and olefinically unsaturated esters prior to curing.

3. A process as defined by claim 1 wherein said inorganic salt is ammonium perchlorate.

4. A process as defined by claim 1 wherein said cross-linking agent is di-tertiary butyl peroxide.

5. A process as defined by claim 1 wherein said salt is an ammonium salt.

6. A process as defined by claim 1 wherein said salt is a perchlorate.

References Cited by the Examiner

UNITED STATES PATENTS 2,855,372  10/1958  Jenkins et al. _____ 52—0.5 X
2,941,976  6/1960  Philipson.

FOREIGN PATENTS 592,046  9/1947  Great Britain.
655,585  7/1951  Great Britain.
742,283  12/1955  Great Britain.

OTHER REFERENCES

Arendale, "Industrial & Engineering Chemistry," vol. 48, No. 4, April 1956, pp. 725–726.

Blatz, Ind. Eng. Chem., vol. 48, No. 4, April 1956, pp. 727–729.

Chem. and Eng. News, Oct. 7, 1957, pp. 62–63.

Deschere, Ind. Eng. Chem., vol. 49, No. 9, September 1957, pp. 1333–6.

"Jet Propulsion," Air Technical Service Command, 1946, p. 158.

Ritchey, Chem. and Eng. News, Nov. 11, 1957, pp. 78–82.

Science News Letter, May 11, 1957, vol. 7, p. 302.

Zaehringer, "Solid Propellant Rockets," American Rocket Co., Box 1112, Wyandotte, Mich. (1955), pp. 62, 63, 79, 80.

Zaehringer, Chem. Eng. Progress, vol. 51, No. 7, July 1955, p. 302.

REUBEN EPSTEIN, *Primary Examiner.*

LEON D. ROSDOL, ROGER L. CAMPBELL,
*Examiners.*